(12) United States Patent
Yamaguchi et al.

(10) Patent No.: US 6,470,674 B1
(45) Date of Patent: Oct. 29, 2002

(54) DETERIORATION DETECTING APPARATUS AND METHOD FOR ENGINE EXHAUST GAS PURIFYING DEVICE

(75) Inventors: Masahiko Yamaguchi, Obu; Masaaki Nakayama, Toyoake; Shujiro Morinaga, Takahama, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/702,818

(22) Filed: Nov. 1, 2000

(30) Foreign Application Priority Data

Nov. 8, 1999 (JP) .......................................... 11-316290

(51) Int. Cl.$^7$ ................................................. F01N 3/00
(52) U.S. Cl. ............................. 60/277; 60/274; 60/276; 60/285
(58) Field of Search ........................ 60/274, 276, 277, 60/285

(56) References Cited

U.S. PATENT DOCUMENTS

| | | | | |
|---|---|---|---|---|
| 4,947,818 A | * | 8/1990 | Kamohara et al. ............. | 60/276 |
| 5,077,970 A | * | 1/1992 | Hamburg ...................... | 60/277 |
| 5,220,788 A | | 6/1993 | Kurita et al. | |
| 5,228,286 A | * | 7/1993 | Demura ........................ | 60/277 |
| 5,313,791 A | * | 5/1994 | Hamburg et al. ............. | 60/277 |
| 5,325,664 A | * | 7/1994 | Seki et al. .................... | 60/277 |
| 5,487,269 A | * | 1/1996 | Atanasyan et al. ........... | 60/277 |
| 5,528,898 A | * | 6/1996 | Nakayama et al. ........... | 60/277 |
| 5,622,047 A | * | 4/1997 | Yamashita et al. ............ | 60/277 |
| 5,636,514 A | * | 6/1997 | Seki ............................. | 60/277 |
| 5,678,402 A | * | 10/1997 | Kitagawa et al. ............. | 60/277 |
| 5,762,055 A | * | 6/1998 | Yamashita et al. ............ | 60/277 |
| 5,945,597 A | * | 8/1999 | Poublon et al. ............... | 60/277 |
| 5,983,629 A | * | 11/1999 | Sawada ....................... | 60/277 |
| 6,085,518 A | | 6/2000 | Yamashita et al. | |

FOREIGN PATENT DOCUMENTS

JP         2000-97081         4/2000

* cited by examiner

Primary Examiner—Thomas Denion
Assistant Examiner—Tu M. Nguyen
(74) Attorney, Agent, or Firm—Nixon & Vanderhye P.C.

(57) ABSTRACT

Air/fuel ratio responsive sensors are disposed upstream and downstream a catalyst to feedback-control air/fuel ratio based on the output of the upstream sensor while effecting sub-feedback control based on the downstream sensor. in a catalyst deterioration detecting processing, a proportional gain and an integral gain of a sub-feedback control are increased so that the downstream sensor output changes more remarkably in correspondence with deterioration of the catalyst. As the catalyst degrades, the amplitude and the frequency of the downstream sensor output increase. Catalyst deterioration is detected based on a ratio of downstream sensor output change to upstream sensor output change.

18 Claims, 9 Drawing Sheets

DETERIORATION DETECTING APPARATUS AND METHOD FOR ENGINE EXHAUST GAS PURIFYING DEVICE

CROSS REFERENCE TO RELATED APPLICATION

This application is based on and incorporates herein by reference Japanese Patent Application No. 11-316290 filed Nov. 8, 1999.

BACKGROUND OF THE INVENTION

The present invention relates to a deterioration detecting apparatus and method for detecting deterioration of an engine exhaust gas purifying device such as a catalyst converter based on the output of an oxygen sensor or an air/fuel ratio sensor disposed downstream the exhaust gas purifying device.

In recent engine exhaust gas purifying systems of automotive vehicles, an air/fuel ratio sensor or an oxygen sensor is disposed upstream and downstream an engine exhaust gas purifying catalytic converter. The upstream sensor is used to feedback-control the air/fuel ratio in the exhaust gas to an air/fuel ratio target, and the upstream sensor and the downstream sensor are used to detect the deterioration of the catalyst based on the ratio of frequencies and/or amplitudes of the outputs of the sensors.

The air/fuel ratio feedback control operates to alternately increase and decrease the feedback correction value in a generally periodic manner during the feedback control operation, so that the output of the upstream sensor responsively changes to a rich air/fuel ratio side and a lean air/fuel ratio side crossing the air/fuel ratio target. As the output of the upstream sensor also varies with engine operating conditions, the output of the downstream sensor also changes responsively. It is required for this reason to maintain the catalyst deterioration detecting operation to be less influenced by the changes in the output of the upstream sensor due to the changes in the operating conditions of the engine.

U.S. Pat. No. 5,220,788 (JP-A-5-10182) proposes to detect the deterioration of the exhaust gas purifying catalyst based on the output of the downstream sensor during a catalyst deterioration detecting period by forcibly modifying the changing period of the feedback correction value. However, the changing period of the air/fuel ratio feedback correction value should be set to maximize the exhaust purifying efficiency of the catalyst during the normal engine operating conditions. Thus, forced modification of the feedback correction value is likely to lower the accuracy of the air/fuel ratio feedback control and the exhaust gas purification efficiency during the normal operation conditions.

SUMMARY OF THE INVENTION

It is therefore an object of the present invention to provide a deterioration detecting apparatus and method for engine exhaust gas purifying devices, which is capable of detecting the deterioration of the purifying device accurately without lowering the exhaust gas purifying efficiency of the purifying device.

According to the present invention, oxygen responsive upstream and downstream sensors are disposed upstream and downstream a catalyst. An air/fuel ratio feedback control is effected to control an air/fuel ratio in the exhaust to an air/fuel ratio target based on an output of the upstream sensor. A sub-feedback control is effected to control the air/fuel ratio target based on an output of the downstream sensor. Deterioration of the catalyst is detected based on at least the output of the downstream sensor. A feedback gain of the sub-feedback control is changed during a catalyst deterioration detecting operation so that the downstream sensor exhibits larger changes in its output as the catalyst deteriorates more.

Preferably, the gain change is delayed for a predetermined period after a catalyst deterioration detecting condition is satisfied so that a fuel cut-off operation or fuel increase operation will not influence the deterioration detecting operation. Further, the amount of change in the feedback gain of the sub-feedback control is varied based on operating conditions of the engine.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

The present invention will be described in further detail with reference to various embodiments.

(First Embodiment)

Figure 1:
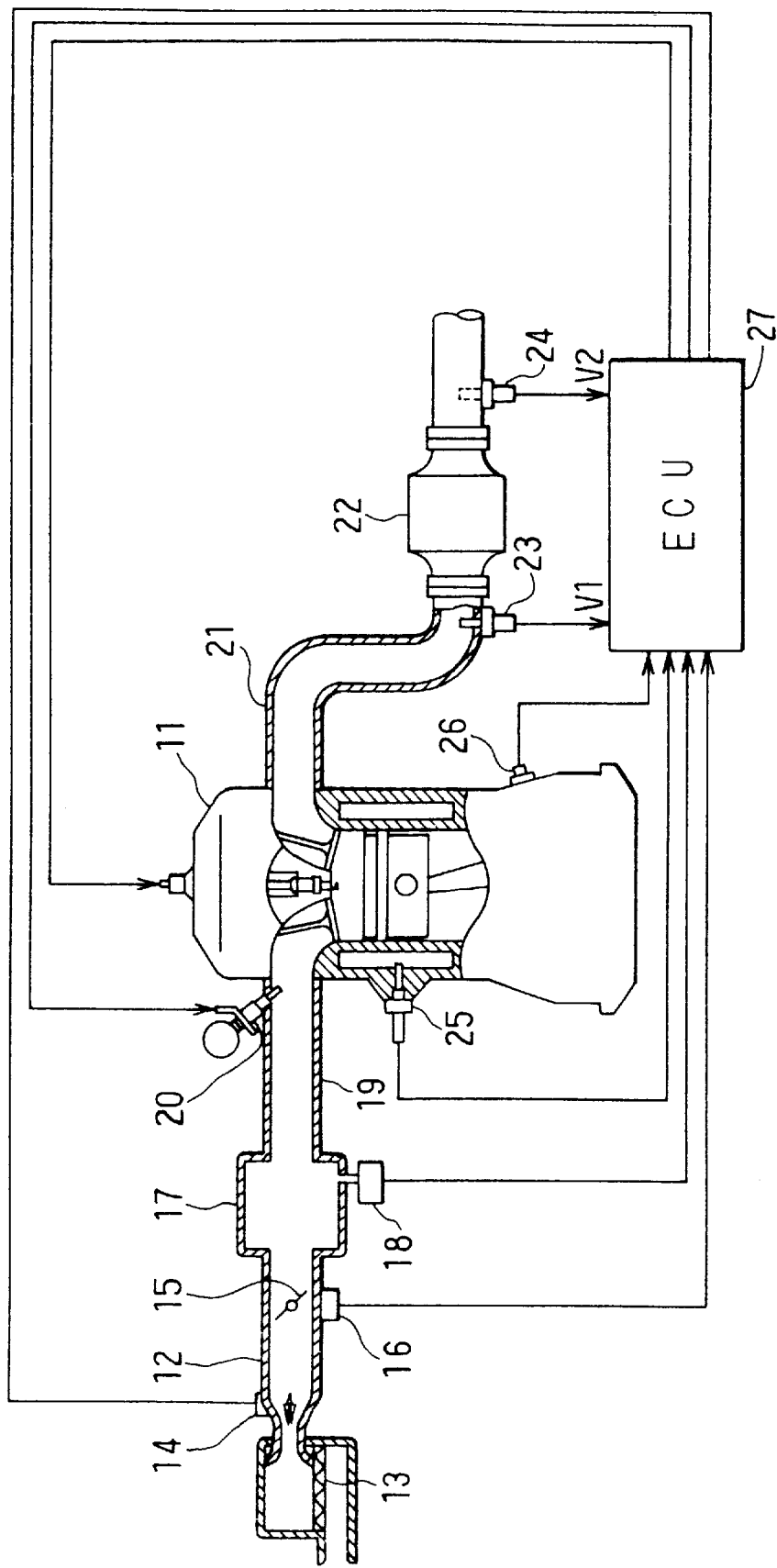
FIG. 1 is a schematic structural diagram of the whole engine control system, according to a first embodiment of the present invention.

Referring first to FIG. 1, an internal combustion engine 11 has an intake pipe 12. An air cleaner 13 is installed in the most upstream portion of an intake pipe 12, and an airflow meter 14 for detecting the intake air amount is installed downstream of the air cleaner 13. A throttle valve 15 and a throttle angle sensor 16 for detecting the degree of throttle opening angle are installed downstream of the airflow meter 14. Furthermore, a surge tank 17 is installed downstream of throttle vale 15, and an intake pipe pressure sensor 18 for detecting the intake pipe pressure is installed on the surge tank 17. Moreover, intake manifolds 19 for supplying air into cylinders of the engine 11 are installed on the surge tank 17, and fuel injectors 20 for injecting fuel are attached in the vicinity of the intake ports of the intake manifolds 19.

The engine 11 also has an exhaust pipe 21. A catalytic converter 22 including an exhaust gas purifying catalyst is disposed in the exhaust pipe 21 to purify toxic components (CO, HC, NOx and the like) in the exhaust gas. Sensors 23 and 24 which are responsive to oxygen concentration in the exhaust gas are disposed upstream and downstream the catalytic converter 22, respectively. The upstream sensor 23 is preferably an air/fuel ratio sensor which produces its output V1 in linear relation to the oxygen concentration (air/fuel ratio). The downstream sensor 24 is preferably an oxygen sensor which produces it output V2 in stepwise relation to the oxygen concentration (air/fuel ratio) with respect to the stoichiometric ratio. A coolant temperature sensor 25 and a crank angle sensor 26 are provided on the cylinder block of the engine 11 for detecting the coolant temperature and the crankshaft rotation, respectively. The above sensors are connected to an engine control unit (ECU) 27.

The ECU 27 is comprised of a microcomputer and associated circuits and programmed to execute various engine control processing. The engine control processing particularly includes an air/fuel ratio feedback (F/B) control processing and a sub-feedback control processing to control the air/fuel ratio in the exhaust gas to the air/fuel ratio target $\lambda TG$ based on the outputs of the upstream sensor 23 and the downstream sensor 24. In the air/fuel ratio feedback control processing, an air/fuel ratio feedback correction value (main feedback correction value) FAF1 is calculated based on the output V1 of the upstream sensor 23 thereby to feedback-correct the catalyst upstream air/fuel ratio (fuel injection amount) to the air/fuel ratio target $\lambda TG$.

In the sub-feedback control processing, a sub-feedback correction value FAF2 is calculated as follows based on the output V2 of the downstream sensor 24 thereby to correct the upstream air/fuel ratio target $\lambda TG$, so that the catalyst downstream air/fuel ratio is controlled to a control target (e.g., stoichiometric ratio).

Figure 4A:
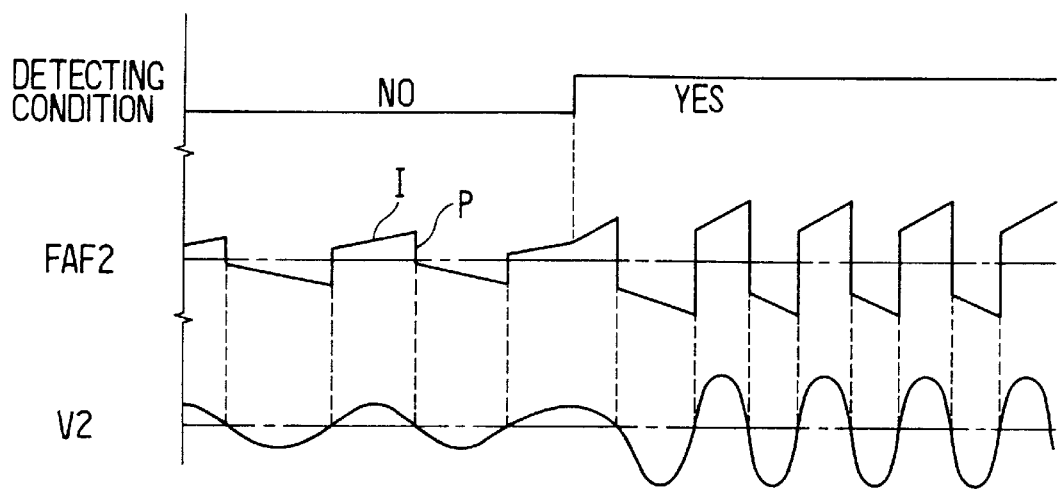
FIGS. 4A to 4C are timing charts showing the catalyst deterioration detecting operation in the first embodiment.
Figure 4B:
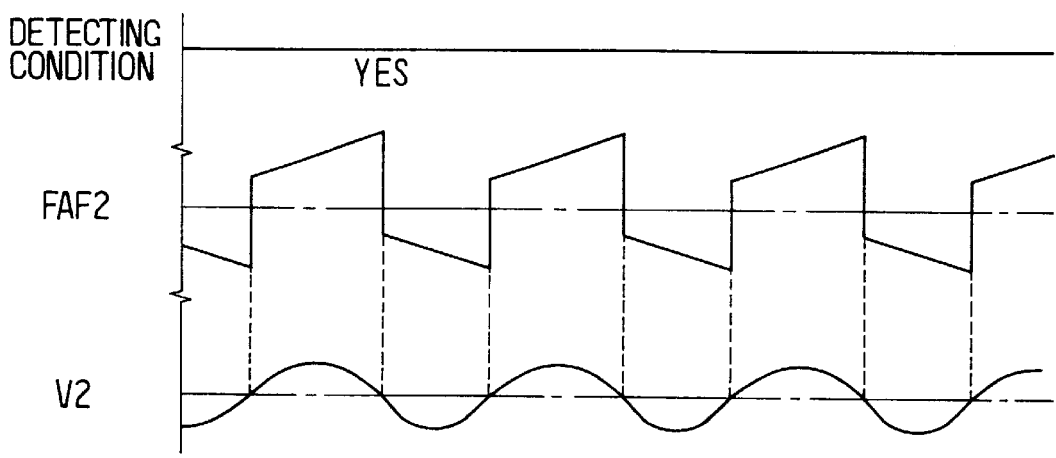
Figure 4C:
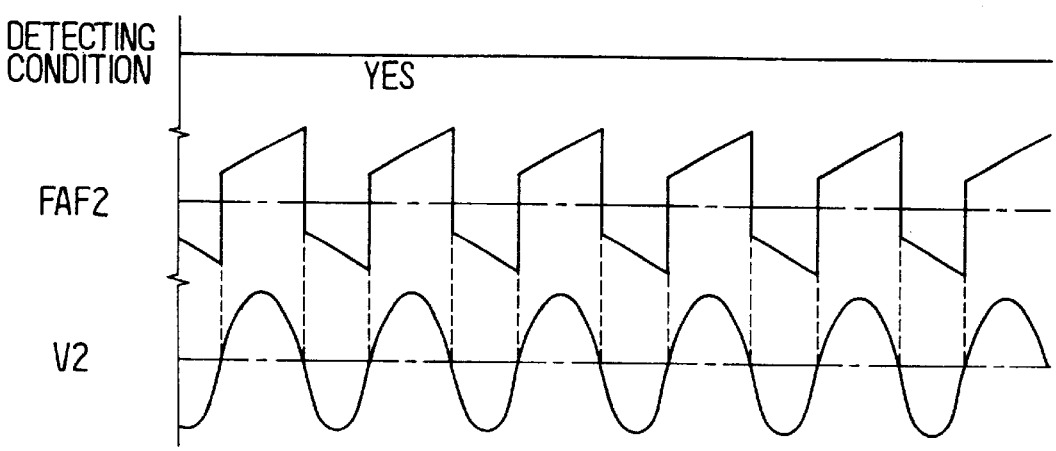

It is first checked whether the downstream air/fuel ratio is richer or leaner than the control target by comparing the output V2 of the downstream sensor 24 with a reference voltage, e.g., 0.45 volts corresponding to the stoichiometric ratio. AS shown in FIGS. 4A to 4C, an integral calculation (I) is attained by adding a predetermined amount repeatedly to the sub-feedback correction value FAF2 during the period the check result indicates that the downstream air/fuel ratio remains rich. A proportional calculation (P) is attained by subtracting a predetermined amount from the sub-feedback correction value FAF2 when the check result indicates that the downstream air/fuel ratio has inverted from rich to lean. The integral calculation (I) is attained by subtracting the predetermined amount repeatedly from the sub-feedback correction value FAF2 during the period the check result indicates that the downstream air/fuel ratio remains lean.

The proportional calculation (P) is attained by adding the predetermined amount from the sub-feedback correction value FAF2 when the check result indicates that the downstream air/fuel ratio has inverted from lean to rich. Thus, the air/fuel ratio target $\lambda TG$ is alternately changed to the rich side and lean side by changing the sub-feedback correction value FAF2 at every inversion of the output V2 of the downstream sensor 24. This sub-feedback correction value FAF2, the air/fuel ratio target $\lambda TG$ is corrected.

The main feedback correction value FAF1 is calculated to reduce the deviation of the upstream air/fuel ratio (output V1 of the upstream sensor 23) from the air/fuel ratio target $\lambda TG$ in the air/fuel ratio feedback control processing. This main feedback correction value FAF1 is used to correct the amount of fuel which is calculated based on various engine conditions.

Figure 2:
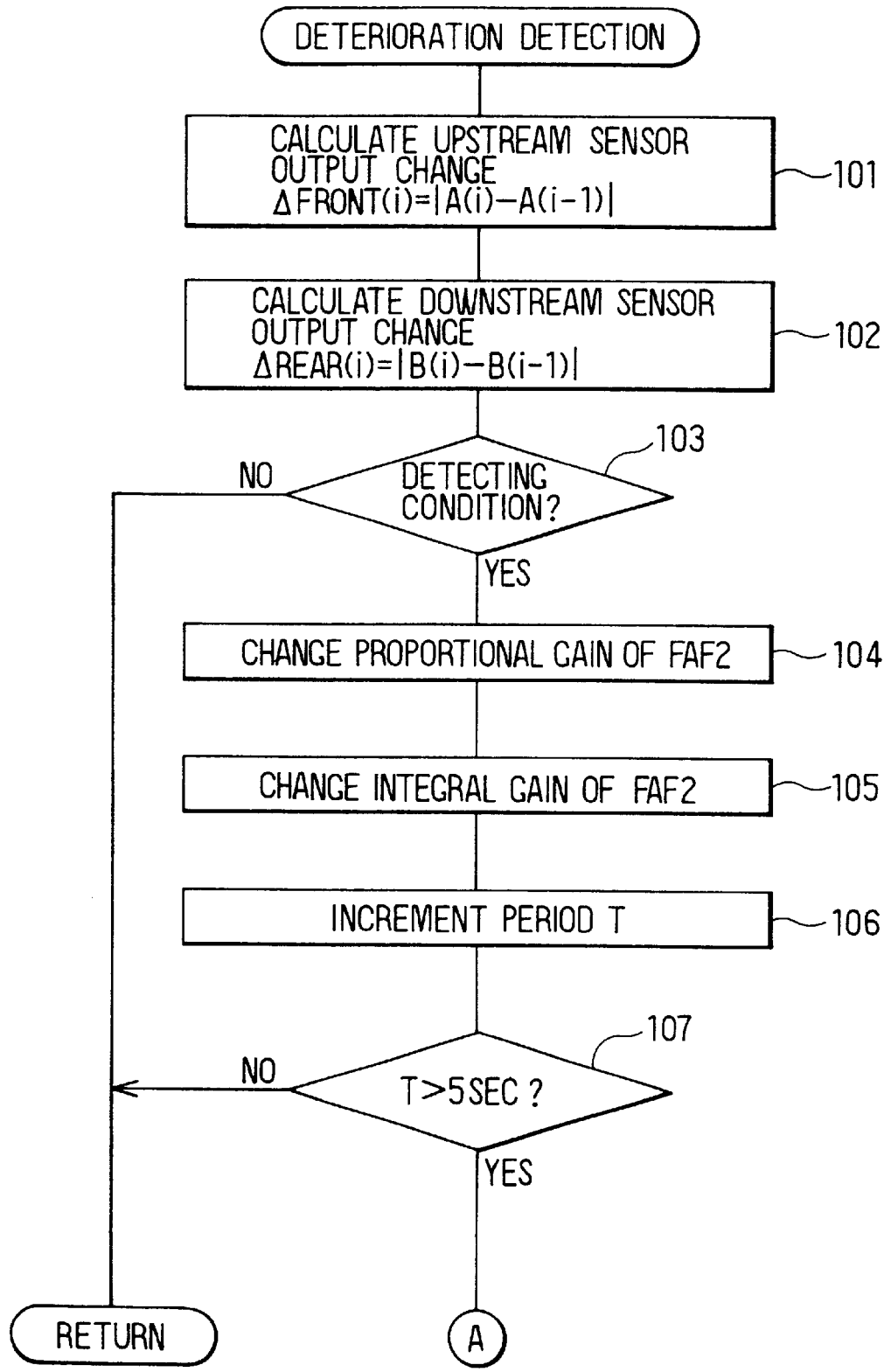
FIG. 2 is a flow chart showing a part of a catalyst deterioration detecting processing executed in the first embodiment.
Figure 3:
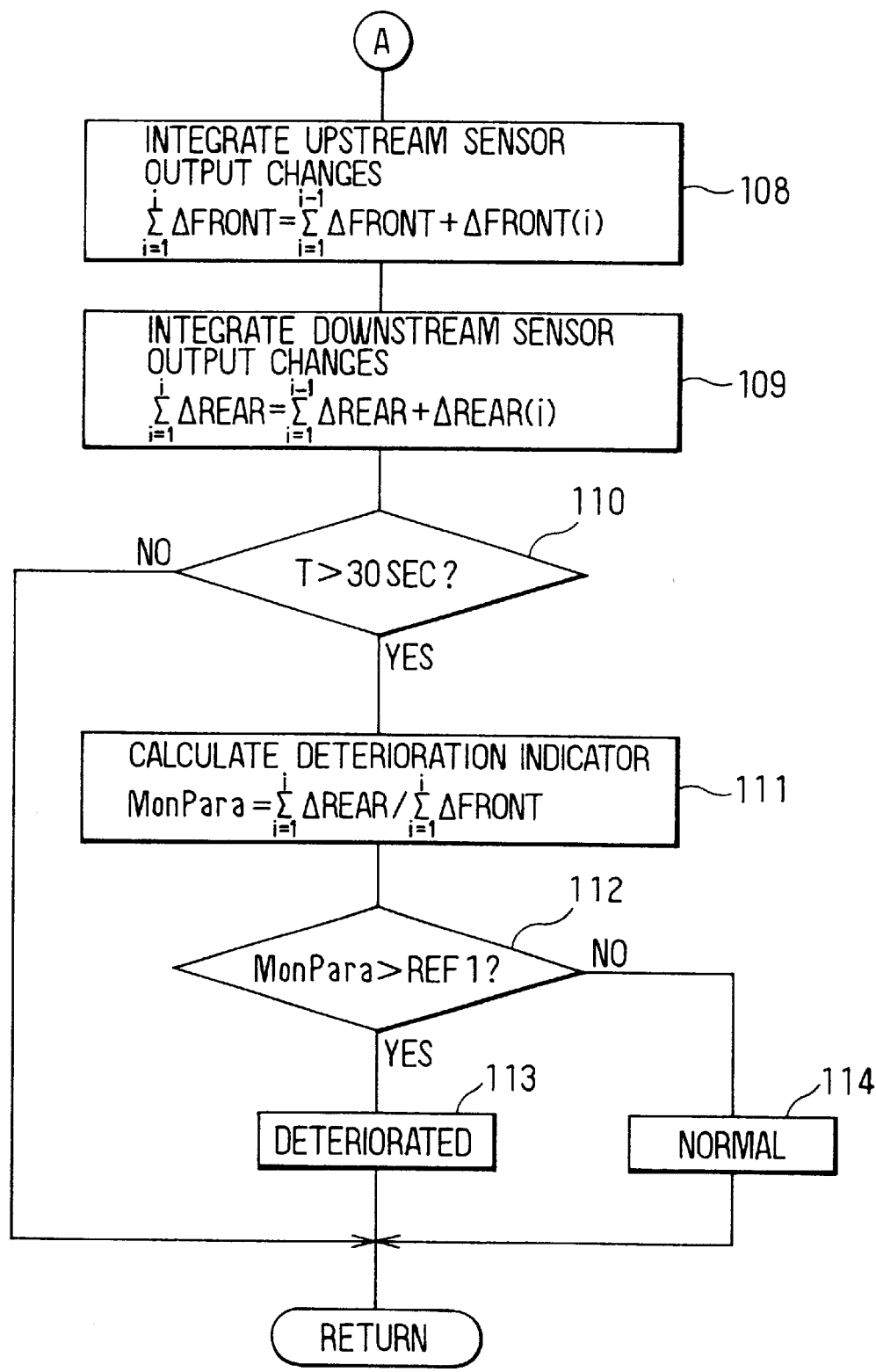
FIG. 3 is a flow chart showing another part of the catalyst deterioration detecting processing executed in the first embodiment.

The ECU 27 executes the catalyst deterioration detecting processing shown in FIGS. 2 and 3. It is to be noted that a gain of integration I (integral gain) and a gain of proportion P (proportional gain) of the sub-feedback correction value FAF2 are changed to larger values during the catalyst deterioration detecting period. That is, in this deterioration detecting processing, the air/fuel ratio is controlled in such a manner that the output V2 of the downstream sensor 24 exhibits a large difference between a deteriorated catalyst and a normal (non-deteriorated) catalyst. The frequency and the amplitude of the output V2 of the downstream sensor 24 increases as the catalyst deterioration progresses. Therefore, the catalyst deterioration can be detected based on either one of the following methods (1) to (5).

(1) Measurement of Sensor Output Trajectory Length

The catalyst deterioration is detected by measuring the trajectory length of the sensor output V2, because the trajectory length increases due to increases in the amplitude and the frequency of the sensor output V2 in the case of catalyst deterioration.

(2) Measurement of Sensor Output Area

The catalyst deterioration is checked by measuring the area of the output V2. The area is defined by both the deviation of the output V2 from the reference Vr and the period in which the output V2 remains in the same polarity with respect to the reference Vr, and is determined by integrating the difference between the sensor output V2 and the reference Vr. The area increases as the catalyst deteriorates.

(3) Measurement of Number of Inversions of Sensor Output

The catalyst deterioration is checked by counting the number of inversions of the sensor output V2 based on the frequency of the sensor output V2. The count increases and the period of inversion decreases as the catalyst deteriorates.

(4) Measurement of Amplitude of Sensor Output

The catalyst deterioration is checked by measuring the amplitude of the sensor output. The amplitude increases as the catalyst degrades.

In these methods (1) to (4), the measurement will be influenced by changes in the output of the upstream sensor 23. Therefore, it is preferred to compare the values calculated from the downstream sensor output V2 with values calculated from the upstream sensor output V1 in the corresponding manner.

(5) Measurement of Sensor Response Delay Period

The exhaust gas adsorption saturation amount (storage amount) of the exhaust gas decreases and the amount of the exhaust gas components discharged without being purified in the catalyst increases, as the catalyst degrades. The inversion in the output V2 of the downstream sensor 24 occurs after a delay period from the inversion of the air/fuel ratio target $\lambda TG$. The response delay period of the downstream sensor 24 decreases as the catalyst degrades, because the exhaust gas passes the catalyst without being adsorbed in the catalyst. Thus, the catalyst deterioration is checked by measuring the response delay period.

The catalyst deterioration detecting processing shown in FIGS. 2 and 3 is based on the method (1).

In this processing, first at step 101, an upstream output change amount ΔFront(i) of the upstream (front) sensor 23 from the preceding calculation time to the present calculation time is calculated as follows using the present output A(i) and the preceding output A(i−1).

$$\Delta Front(i)=|A(i)-A(i-1)|$$

Similarly, at step 102, a downstream output change amount ΔRear(i) of the downstream (rear) sensor 24 from the preceding calculation time to the present calculation time is calculated as follows using the present output B(i) and the preceding output B(i−1).

$$\Delta Rear(i)=|B(i)-B(i-1)|$$

Then, at step 103, it is checked whether a deterioration detecting condition is satisfied. For instance, the detecting condition may be defined as follows:

the air/fuel ratio is being feedback-controlled;

an engine load is within a predetermined range;

an engine speed is within a predetermined range;

a vehicle speed is within a predetermined range; and an engine is in a stable operation.

If the check result is NO, that is, if any one of the above is not satisfied, the processing ends. If the check result is YES, the proportional gain and the integral gain of the sub-feedback correction value FAF2 are changed to a larger value at steps 104 and 105, respectively. These changes may be the same with or different from each other.

Then, a period T in which the detecting condition is continuously satisfied is measured at step 106 by incrementing a period measuring counter. It is then checked at step 107 whether the period T has reached a predetermined period (e.g., 5 seconds). If the check result is NO (T<5), the detection processing ends so that the air/fuel ratio feedback control stabilizes after forcibly changing the sub-feedback correction value FAF2. If the check result is YES (T>5), it is determined that the air/fuel ratio feedback control has stabilized. Then, at step 108, the present upstream output change ΔFront(i) is added (integrated) to a preceding integration value ΣΔFront as follows.

$$\Sigma\Delta Front=\Sigma\Delta Front+\Delta Front(i)$$

Similar to step 108, the present downstream output change ΔRear(i) is added (integrated) to a preceding integration value ΣΔRear at step 109 as follows.

$$\Sigma\Delta Rear=\Sigma\Delta Rear+\Delta Rear(i)$$

It is further checked at step 110 whether the measured period T has reached another predetermined period (e.g., 30 seconds). If the check result is NO (T<30), the processing ends. If the check result is YES (T>30), a deterioration indicator parameter MonPara is calculated as follows at step 111 to determine the degree of catalyst deterioration. This parameter is defined as a ratio of a sum of the downstream output changes relative to a sum of the upstream output changes.

$$MonPara=\Sigma\Delta Rear/\Sigma\Delta Front$$

This calculated parameter MonPara is compared with a predetermined deterioration detecting reference REF1 at step 112. If the check result is NO (MonPara<REF1), it is determined at step 112 that the catalyst is normal, that is, not yet deteriorated. If the check result is YES (MonPara>REF1), it is determined at step 113 that the catalyst has deteriorated. Thus, the catalyst deterioration detecting processing is completed.

According to the first embodiment, as shown in FIG. 4A, when the catalyst deterioration detecting condition is satisfied (YES), the proportional gain and the integral gain of the sub-feedback correction value FAF2 are increased so that the downstream sensor output V2 changes more remarkably when the catalyst has degraded. In the case of a normal (non-degraded) catalyst, as shown in FIG. 4B, the frequency and the amplitude of output V2 do not change so much even if the gains are increased. However, in the case of a degraded catalyst, as shown in FIG. 4C, the frequency and the amplitude change remarkably with the increased gains. Thus, the catalyst degradation can be detected accurately by evaluating relative ratio of the downstream sensor output V2 to the upstream sensor output V1.

Further, because the sub-feedback control is effected to set the air/fuel ratio target λTG at the upstream of the catalytic converter 22, deviations of the air/fuel ratio to the richer side or leaner side in the catalyst converter 22 can also be corrected thereby to efficiently purify the exhaust gas. In this embodiment, it is also possible to change only either the proportional gain or the integral gain.

(Second Embodiment)

Figure 5:
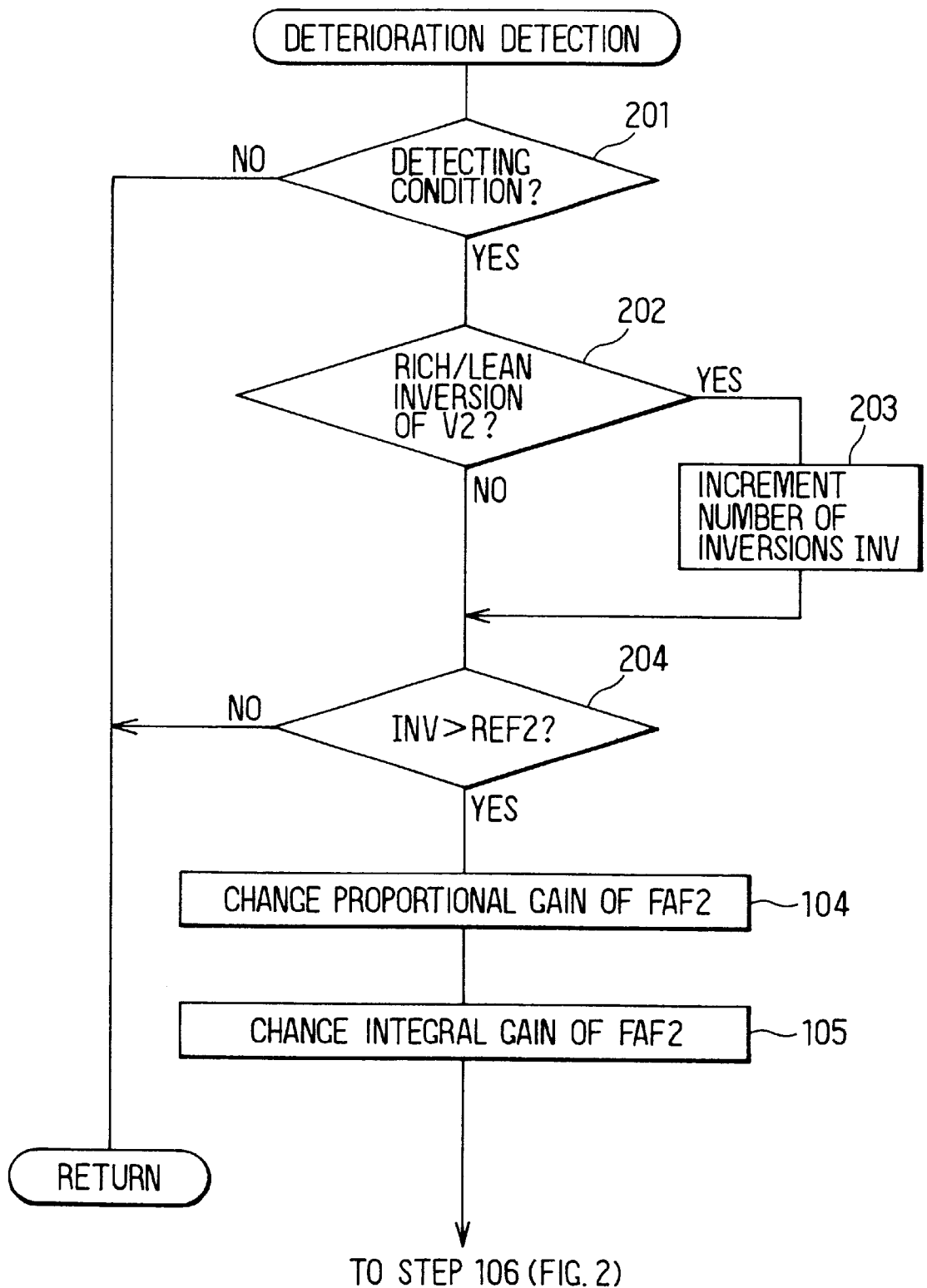
FIG. 5 is a flow chart showing a catalyst deterioration detecting processing executed in a second embodiment of the present invention.
Figure 6:
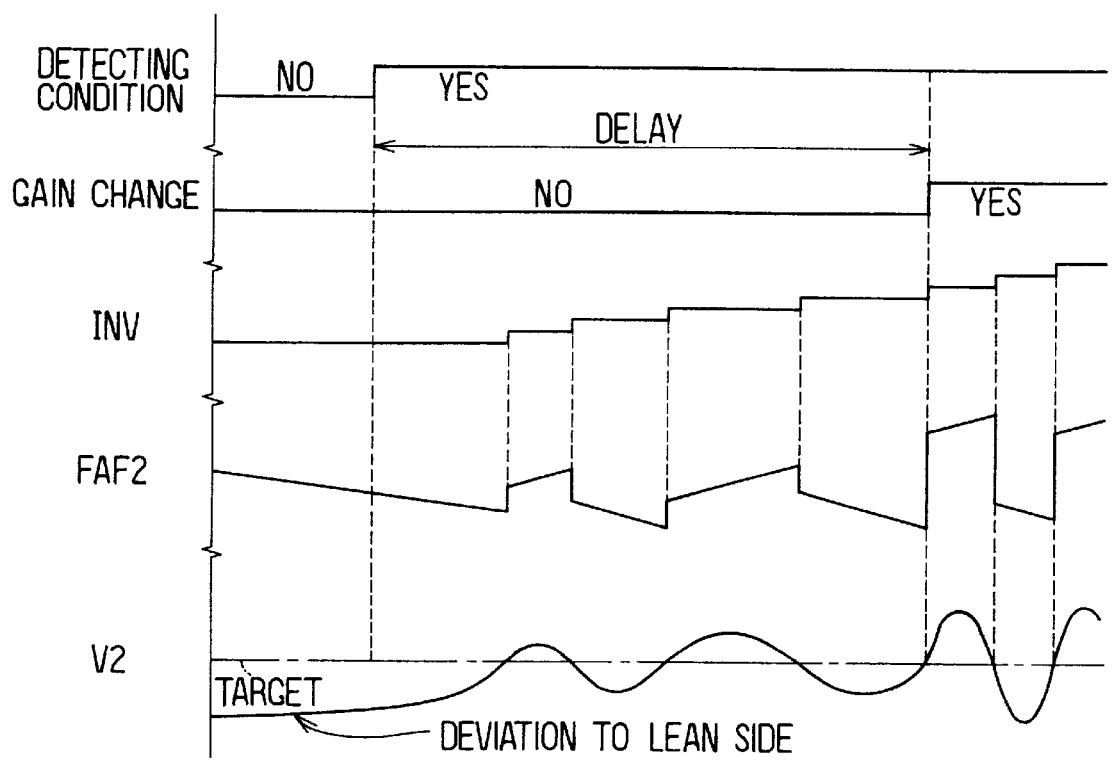
FIG. 6 is a time chart showing a catalyst deterioration detecting operation in the second embodiment.

A second embodiment shown in FIG. 5 is a modification of the first embodiment to cope with cases in which the fuel injection is cut off or the amount of fuel is increased for a high engine load operation. In those cases, as shown in FIG. 6, it takes a certain period for the air/fuel ratio in the catalytic converter 22 to return to the normal ratio (λ=1), because the air/fuel ratio deviates to the leaner side or the richer side immediately after the fuel cut-off or increase. If the catalyst deterioration is detected under this condition, the downstream sensor output V2 is influenced by this deviation and hence the catalyst deterioration cannot be effected accurately.

In the second embodiment, therefore, a certain delay period is provided as shown in FIG. 6 after the catalyst deterioration detecting condition is satisfied, so that the gains of the sub-feedback correction value FAF2 are changed after the delay time. As the downstream sensor output V2 is inverted between the rich level and the lean level, the air/fuel ratio in the catalyst gradually approaches the normal condition. Therefore, The delay period may be set in accordance with the number of inversion of the output V2.

The catalyst deterioration detection processing is executed as shown in FIG. 5. It is first checked at step 201 whether the catalyst deterioration detecting condition is satisfied. If the check result is YES, it is checked at step 202 whether the output V2 has inverted between the rich level and the lean level. If the check result is YES, the number of inversions INV is counted by incrementing a counter.

Following step 202 (NO) or step 203, it is checked at step 204 whether the counted inversion INV reaches a predetermined inversion number reference REF2. If the check result is NO (INV<REF2) indicating that it is still within delay period, the processing ends. If the check result is YES (INV>REF2) indicating that the delay period has elaped, the proportional gain and the integral gain of the sub-feedback correction value FAF2 are changed to the larger value at steps 104 and 105, respectively, followed by steps 106 to 113 in the same manner as in the first embodiment (FIGS. 2 and 3).

(Third Embodiment)

Figure 8:
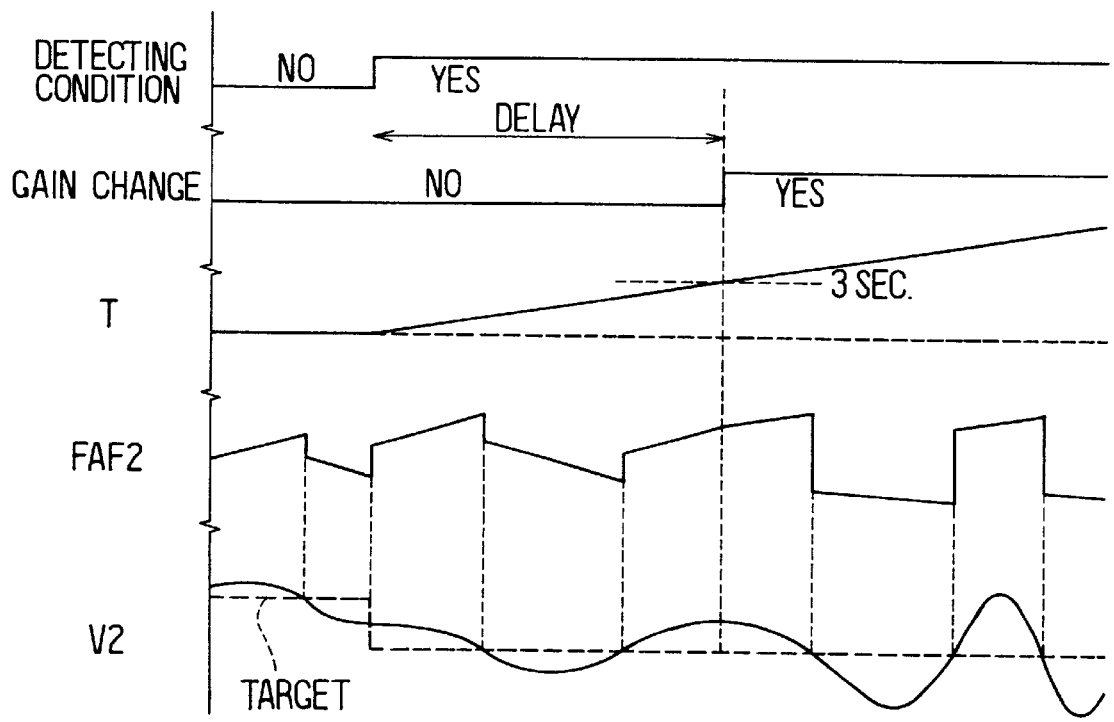
FIG. 8 is a time chart showing a catalyst deterioration detecting operation in the third embodiment.
Figure 7:
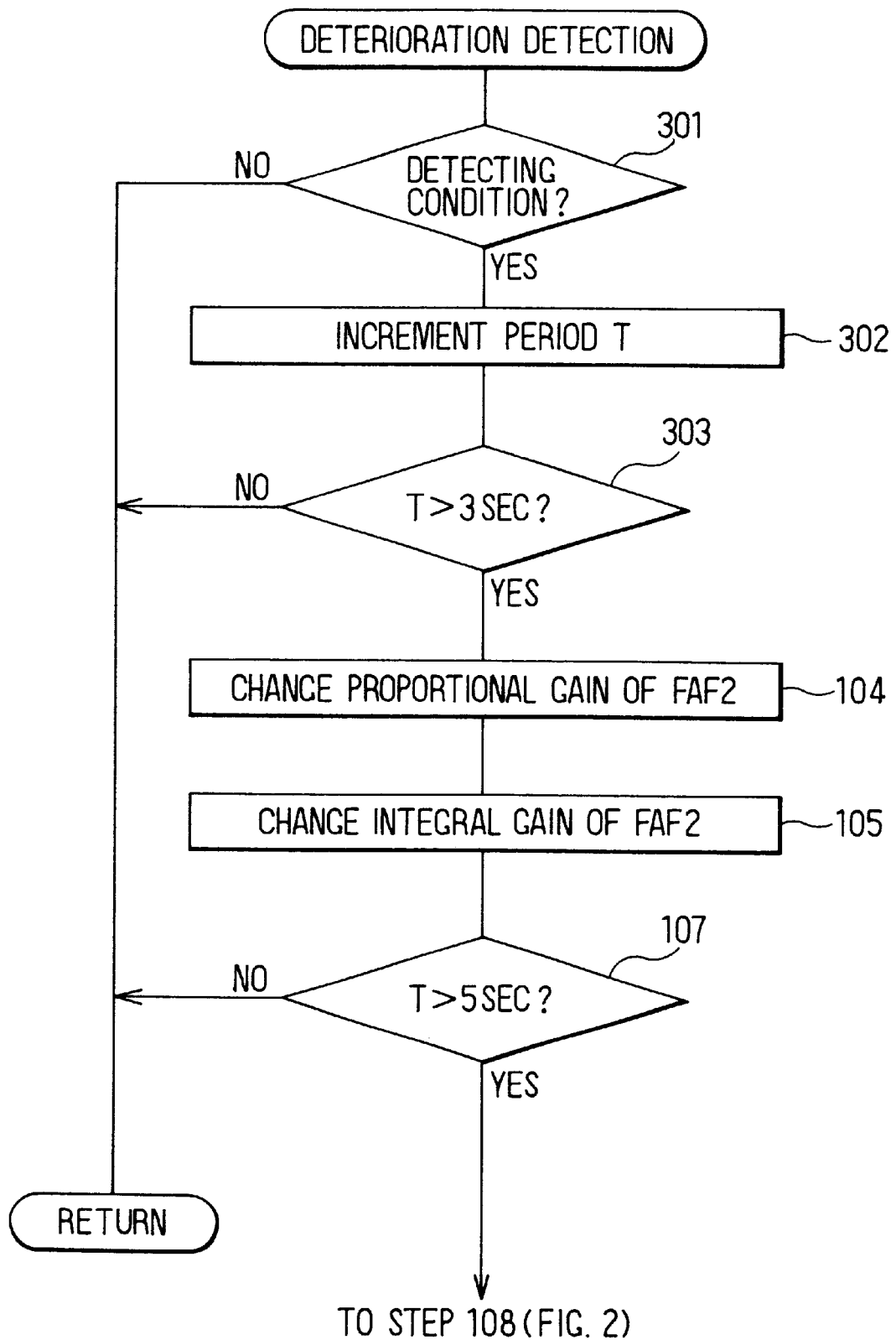
FIG. 7 is a flow chart showing a catalyst deterioration detecting processing executed in a third embodiment of the present invention.

In a third embodiment shown in FIGS. 7 and 8, the delay period is set based on time. As shown in FIG. 7, it is first checked at step 301 whether the catalyst deterioration detecting condition is satisfied. If the check result is YES, a time period T from the YES check result is measured at step 302, and the measured time period T is compared with a predetermined reference period, e.g., 3 seconds, at step 303. If the check result is NO (T<3), the processing ends. However, if the check result is YES (T>3), the proportional gain and the integral gain of the sub-feedback correction value FAF2 are increased at steps 104 and 105, respectively, followed by steps 107 and 113 in the same manner as in the first embodiment.

In the second and the third embodiments, the delay may be provided only when the catalyst deterioration detecting condition is satisfied immediately after the fuel injection is cut off or the amount of fuel is increased for the high load operation, or when the control target of the air/fuel ratio at the downstream of the catalytic converter 22 is changed at the time when the catalyst deterioration detecting condition is satisfied.

(Fourth Embodiment)

Figure 9:
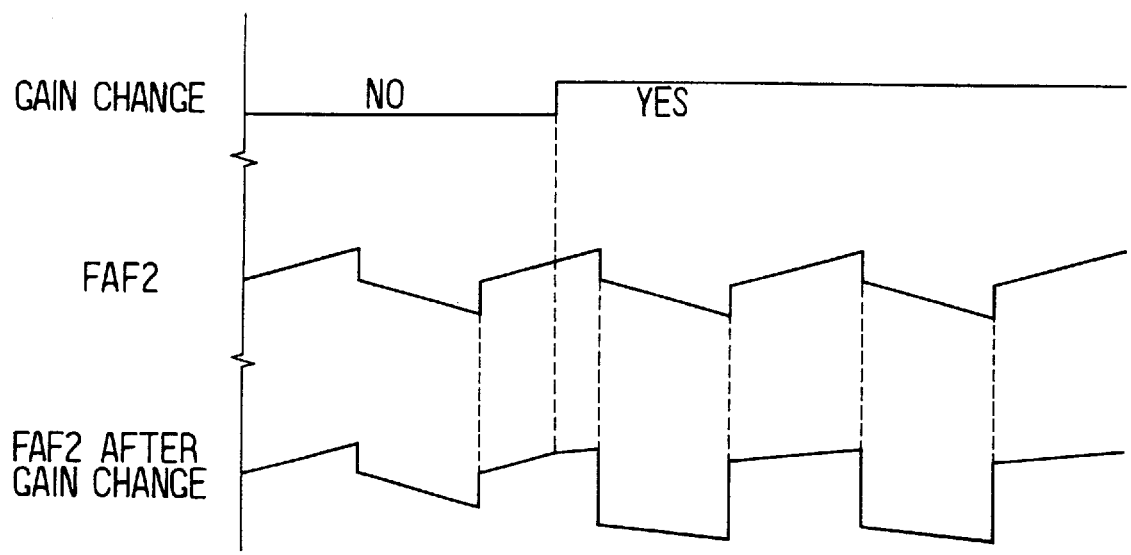
FIG. 9 is a time chart showing a catalyst deterioration detecting operation in a fourth embodiment of the present invention.

In a fourth embodiment, as shown in FIG. 9, the sub-feedback correction value FAF2 is calculated without changing the proportional gain and the integral gain even during the catalyst deterioration detecting processing. Instead, the gains of the sub-feedback correction value FAF2 are changed when the sub-feedback correction value FAF2 is used to modify the main feedback correction value FAF1 (i.e., upstream air/fuel ratio λTG).

The proportional gain and the integral gain may be set arbitrarily. Particularly, the integral gain of the sud-feedback correction value FAF2 may be set to be smaller than that in the normal control condition (not deterioration detecting condition) during the catalyst deterioration detecting period. Because the catalyst deterioration detecting processing is executed while the engine is under the stable condition, the sub-feedback correction value FAF2 changes excessively if the integral gain is set to a large value. As a result, it is likely that the air/fuel ratio which has been stable will deviate. For this reason, it is preferred to set the integral gain to a small value. It is however necessary to set the proportional gain for the catalyst deterioration detection to a value larger than in the normal control condition. This is because the downstream output V2 tends not to invert between the rich level and the lean level if the integral gain is small.

(Fifth Embodiment)

Figure 10:
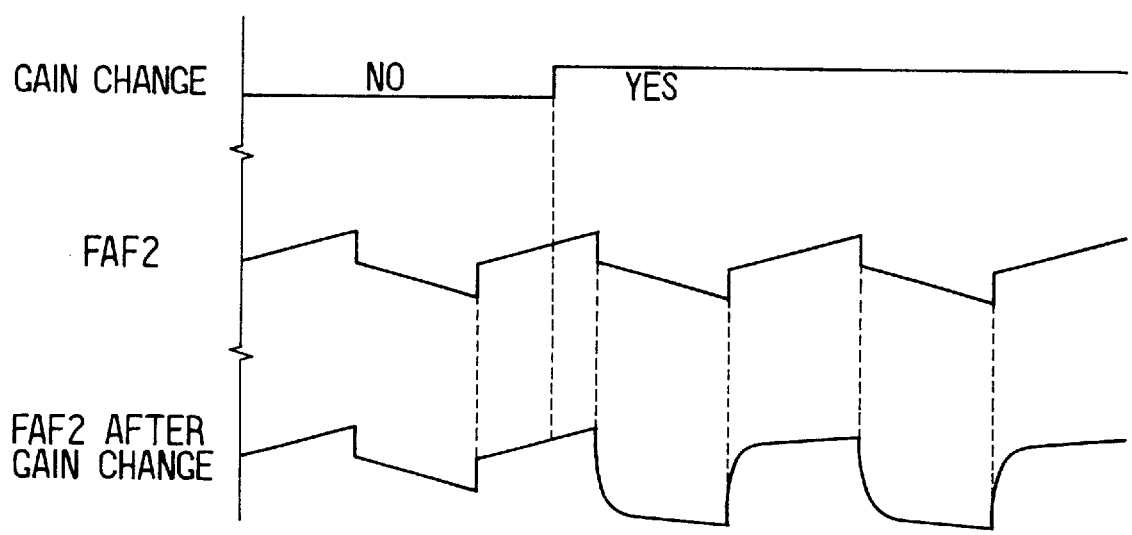
FIG. 10 is a time chart showing a catalyst deterioration detecting operation in a fifth embodiment of the present invention.

In a fifth embodiment, as shown in FIG. 10, the proportional gain of the sub-feedback correction value FAF2 is changed to a value larger than that in the normal control condition and the sub-feedback correction value FAF2 is averaged, when the sub-feedback correction value FAF2 calculated during the catalyst deterioration detecting processing with the same gains as in the normal control condition is used to modify the main feedback correction value FAF1 (upstream air/fuel ratio λTG). Thus, even if the proportional gain is set to a large value during the catalyst deterioration detecting processing, an abrupt change of the sud-feedback correction value FAF2 can be smoothed. In this instance, the air/fuel ratio control can sufficiently follow without causing a delay.

In the fifth embodiment, it is possible to also change the integral gain to a large value in addition to an increase of the proportional gain. It is further possible to directly calculate the sub-feedback correction value FAF2 with the increased gain and smooth the calculated value FAF2 during the catalyst deterioration detecting processing, or to effect the gain change and the smoothing at the same time when the sub-feedback correction value FAF2 is calculated.

(Sixth Embodiment)

Figure 11:
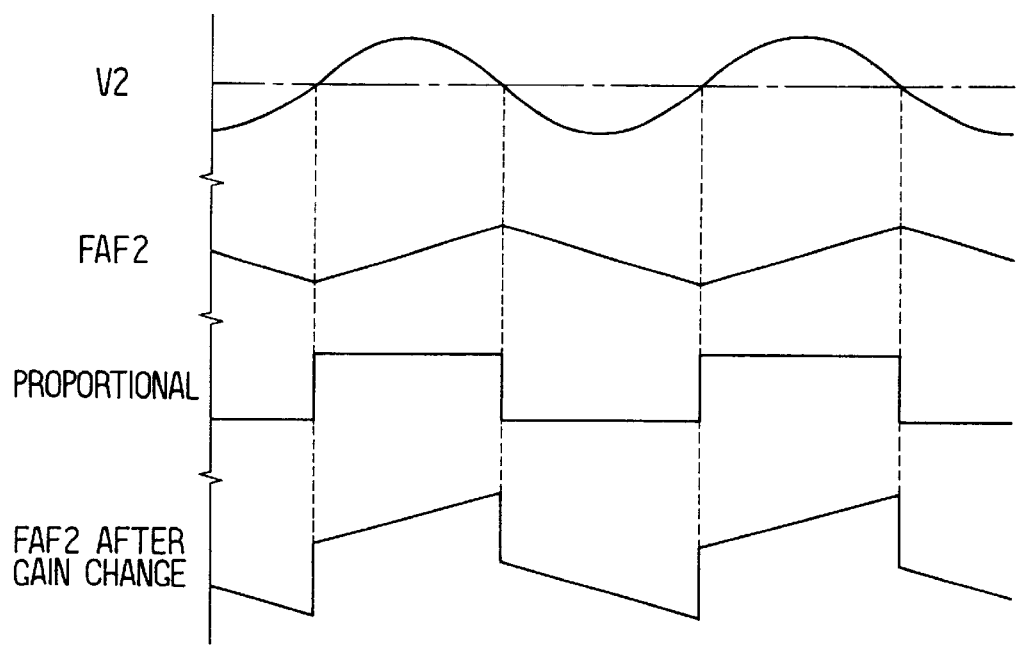
FIG. 11 is a time chart showing a catalyst deterioration detecting operation in a sixth embodiment of the present invention.

In a sixth embodiment, as shown in FIG. 11, the sud-feedback correction value FAF2 is calculated by using only an integral term. The gain of the sub-feedback correction value FAF2 is changed by adding a proportional term, when the sub-feedback correction value FAF2 is used to modify the main feedback correction value FAF1 (upstream air/fuel ratio) during the catalyst deterioration detecting processing. It is possible to change the integral gain of the sub-feedback correction value FAF2 during the catalyst deterioration detecting processing.

(Seventh Embodiment)

Figure 12:
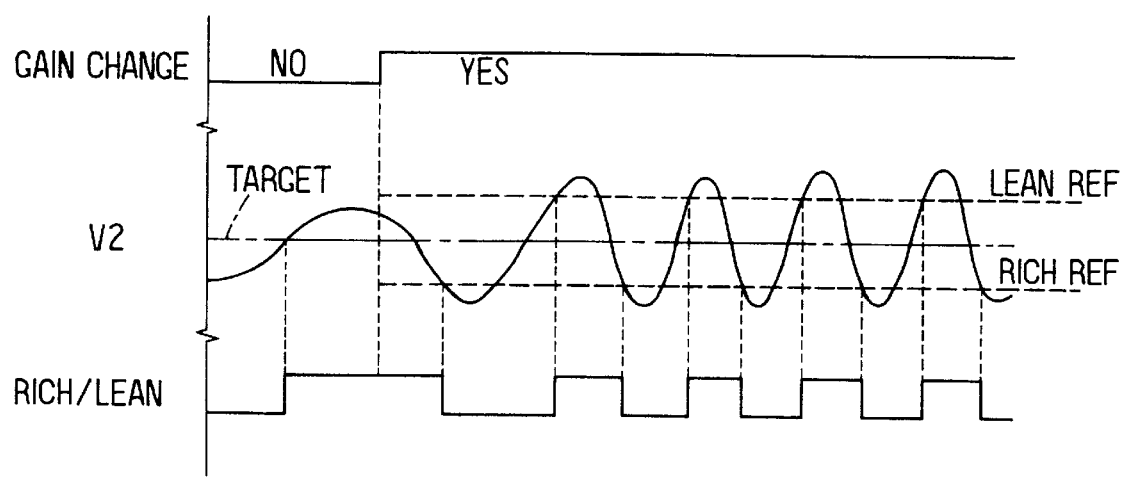
FIG. 12 is a time chart showing a catalyst deterioration detecting operation in a seventh embodiment of the present invention.

In a seventh embodiment, as shown in FIG. 12, two reference values (rich reference and lean reference) are set for determining the richness and leanness of the output V2 of the downstream air/fuel ratio sensor 24 during the catalyst deterioration detecting processing. This is for providing a hysteresis in determination of the richness and leanness. The determination of richness and leanness is stabilized. Further, as the determination of inversion between richness and leanness is slightly delayed than in the normal case, the amplitude and the frequency of the downstream output V2 are increased so that the catalyst deterioration may be detected with ease and accuracy.

The rich reference and the lean reference may be fixed values, or variable with engine operating conditions such as engine load and engine rotation speed. The output V2 of the downstream sensor 24 varies with temperature. Specifically, the amplitude of the output V2 decreases as the engine temperature increases. Thus, it is likely that the richness and leanness cannot be determined in high temperature conditions when the reference values is too different from the control target. As the temperature of the downstream sensor 24 varies with the engine conditions, the richness and leanness reference values can be set to appropriate values to compensate for output changes of the downstream sensor 24 arising from temperature changes.

(Other Embodiments)

In the foregoing embodiments, the amount of changes of gains of the sub-feedback correction values FAF2 during the catalyst deterioration detecting processing may be varied with engine operating conditions. In this instance, the gains of the sub-feedback correction value FAF2 can be increased in any engine operating conditions while ensuring the exhaust gas adsorption of the catalyst within a gas adsorption limit.

Both of the upstream sensor 23 and the downstream sensor 24 may be the same type, that is, a linear air/fuel ratio detecting type or stepwise air/fuel ratio detecting type.

What is claimed is:

1. A deterioration detecting apparatus for an engine having an exhaust purifying catalyst and oxygen responsive upstream and downstream sensors disposed upstream and downstream the catalyst, respectively, the apparatus comprising:

air/fuel ratio feedback control means for effecting an air/fuel ratio feedback control based on an output of the upstream sensor;

sub-feedback control means for effecting a sub-feedback control based on an output of the downstream sensor thereby to reflect the output of the downstream sensor in the air/fuel ratio feedback control; and catalyst deterioration detecting means for detecting deterioration of the catalyst based on the outputs of the downstream sensor and the upstream sensor;

wherein the catalyst deterioration detecting means includes gain changing means for changing a feedback gain of the sub-feedback control during a catalyst deterioration detecting operation of the catalyst deterioration detecting means;

the sub-feedback control means calculates a correction value of the sub-feedback control by using a proportional term and an integral term based on the downstream sensor; and the gain changing means changes gains of the proportional term and the integral term differently from each other.

2. The apparatus as in claim 1, wherein:

the catalyst deterioration detecting means includes delay means for delaying a gain changing operation of the gain changing means for a predetermined period after a catalyst deterioration detecting condition is satisfied.

3. The apparatus as in claim 1, wherein:

the catalyst deterioration detecting means includes smoothing means for smoothing a correction value of the sub-feedback control during the catalyst deterioration detecting operation.

4. The apparatus as in claim 1, wherein:

the gain changing means varies an amount of change in the feedback gain of the sub-feedback control based on operating conditions of the engine.

5. The apparatus as in claim 1, wherein the air/fuel ratio feedback control and the sub-feedback control are effected irrespective of a catalyst deterioration detection operation.

6. The apparatus as in claim 1, wherein:

the feedback gain of the sub-feedback control is changed so that the output from the downstream sensor changes more remarkably in correspondence with deterioration of the catalyst.

7. The apparatus as in claim 1, wherein:

at least one of the amplitude and the frequency of the output from the downstream sensor increases as the catalyst degrades.

8. A deterioration detecting apparatus for an engine having an exhaust purifying catalyst and oxygen responsive upstream and downstream sensors disposed upstream and downstream the catalyst, respectively, the apparatus comprising:

air/fuel ratio feedback control means for effecting an air/fuel ratio feedback control based on an output of the upstream sensor;

sub-feedback control means for effecting a sub-feedback control based on an output of the downstream sensor thereby to reflect the output of the downstream sensor in the air/fuel ratio feedback control;

catalyst deterioration detecting means for detecting deterioration of the catalyst based on the outputs of the downstream sensor and the upstream sensor;

wherein the catalyst deterioration detecting means includes gain changing means for changing a feedback gain of the sub-feedback control during a catalyst deterioration detecting operation of the catalyst deterioration detecting means;

the air/fuel ratio feedback control means effects the feedback control to a target air/fuel ratio;

the sub-feedback control means effects the sub-feedback control on the target air/fuel ratio by using a correction value determined based on the output of the downstream sensor;

the gain changing means changes a magnitude of the correction value in the sud-feedback control between the catalyst deterioration detecting operation and a normal operation other than the catalyst deterioration detecting operation;

the correction value includes at least one of a proportional term and an integral term; and the correction value is increased from a value used in the normal operation when the catalyst deterioration detecting operation is started.

9. The apparatus as in claim 8, wherein the air/fuel ratio feedback control means continues the feedback control by maintaining the target air/fuel ratio determined by the sub-feedback control means during the catalyst deterioration detecting operation.

10. A deterioration detecting method for an engine having an exhaust purifying catalyst and oxygen responsive upstream and downstream sensors disposed upstream and downstream the catalyst, respectively, the method comprising the steps of:

effecting an air/fuel ratio feedback control to control an air/fuel ratio to a target based on an output of the upstream sensor;

effecting a sub-feedback control to change the target of the feedback control based on an output of the downstream sensor;

increasing a feedback gain of the sub-feedback control when the engine is in a deterioration detecting condition;

calculating a catalyst deterioration parameter using the outputs of the upstream sensor and the downstream sensor in the deterioration detecting condition;

detecting a catalyst deterioration when the calculated parameter reaches a reference value;

wherein the feedback gain of the sub-feedback control is increased using a correction value determined based on the output of the downstream sensor, a magnitude of the correction value being changed in the sub-feedback control between the deterioration detecting operation and a non-deterioration detecting operation;

the correction value includes at least one of a proportional term and an integral term; and the correction value is increased from a value used in the non-deterioration detecting operation when the deterioration detecting operation is started.

11. The method as in claim 10, wherein:

an amount of increase in the feedback gain of the sub-feedback control is based on operating conditions of the engine.

12. The method as in claim 10, wherein:

the calculating step calculates the catalyst deterioration parameter as a ratio between a sum of changes of the output of the upstream sensor and a sum of changes of the output of the downstream sensor.

13. The method as in claim 10, wherein the air/fuel ratio feedback control and the sub-feedback control are effected irrespective of a catalyst deterioration detection operation.

14. The method as in claim 10, wherein:

the feedback gain of the sub-feedback control is changed so that the output from the downstream sensor changes more remarkably in correspondence with deterioration of the catalyst.

15. The method as in claim 10, wherein:

at least one of the amplitude and the frequency of the output from the downstream sensor increases as the catalyst degrades.

16. The method as in claim 10, further comprising a step of:

maintaining the target changed by the sub-feedback control during the deterioration detecting condition.

17. The method as in claim 10, further comprising the step of:

delaying a gain increasing operation of the gain increasing step for a predetermined period after the deterioration detecting condition is satisfied.

18. The method as in claim 17, wherein:

the delay period is defined as a number of inversions of the output of the downstream sensor.

* * * * *